United States Patent [19]
Goodhue et al.

[11] 3,884,764
[45] May 20, 1975

[54] METHOD AND COMPOSITION FOR BLOOD SERUM CHOLESTEROL ANALYSIS

[75] Inventors: Charles T. Goodhue, Rochester; Hugh A. Risley, Ontario; Roy E. Snoke, Rochester, all of N.Y.

[73] Assignee: Eastman Kodak Company, Rochester, N.Y.

[22] Filed: Mar. 25, 1974

[21] Appl. No.: 454,622

[52] U.S. Cl. .............................. 195/103.5 R; 195/62
[51] Int. Cl. ............................................. C12k 1/04
[58] Field of Search ................... 195/103.5 R, 4, 30

[56] References Cited
FOREIGN PATENTS OR APPLICATIONS

| | | | |
|---|---|---|---|
| 2,246,695 | 3/1973 | Germany | 195/103.5 R |
| 2,224,132 | 11/1973 | Germany | 195/103.5 R |
| 976,415 | 11/1964 | United Kingdom | 195/66 R |

*Primary Examiner*—A. Louis Monacell
*Assistant Examiner*—C. A. Fan
*Attorney, Agent, or Firm*—A. L. Girard

[57] ABSTRACT

A totally enzymatic method for the quantitative analysis of cholesterol in a complex mixture containing free cholesterol and cholesterol esters comprising the steps of:
1. contacting a sample to be tested with a novel buffered aqueous test solution comprising:
   a. a lipase having cholesterol esterase activity;
   b. a protease; and
   c. cholesterol oxidase; and
2. measuring the quantity of one of the products of the oxidation of cholesterol to determine the total amount of cholesterol in the sample under evaluation. Optionally, an indicator system for quantitatively detecting one or more of the cholesterol oxidation products, for example, peroxidase and a color indicator system which undergoes a color change in the presence of $H_2O_2$ and peroxidase may be included in the aqueous test solution. Quantification is preferably achieved using fluorometric or spectrophotometric techniques. According to a preferred embodiment the buffers aqueous test solution includes a surfactant.

A dry mixture of lyophilized enzymes which need only be dissolved in an accurate amount of water to provide an assay solution and element comprising a porous substrate into which the solution has been embibed and dried are also described.

86 Claims, 4 Drawing Figures

METHOD AND COMPOSITION FOR BLOOD SERUM CHOLESTEROL ANALYSIS

FIELD OF THE INVENTION

The present invention relates to a method for quantitatively assaying for cholesterol and more particularly to a totally enzymatic single solution assay for cholesterol and a novel composition for achieving such an assay.

BACKGROUND OF THE INVENTION

The most common clinical estimation of cholesterol in blood serum is for "total cholesterol." This value is a measure of cholesterol and cholesterol esters present in the serum and anything else such as cholesterol precursors that respond indescriminately to the usual tests which are based on reactions involving "free cholesterol" and require prior conversion of cholesterol esters to free cholesterol.

In the best known conventional technique, serum is extracted with an organic solvent, the extract is saponified with alcoholic KOH and the liberated cholesterol isolated and assayed.

The quantification of free cholesterol is then achieved using any of a variety of techniques well known in the art, for example, a filter photometer as described in U.S. Pat. No. 3,001,950 to Hopper, issued Sept. 26, 1961.

An alternative class of techniques, one of which is described in U.S. Pat. No. 3,479,154, involves precipitation of extracted cholesterol with digitonin, extraction of the precipitate and assay for digitonin.

Another method for cholesterol analysis of blood serum is described in U.S. Pat. No. 3,558,516 to Wybengo (use of solution of ferric perchlorate, an ester solvent and sulfuric acid to determine cholesterol concentration).

Whatever of the prior art methods is used for quantitative assay for cholesterol, the process generally involves the handling of several highly corrosive materials and therefore provides for a rather objectionable procedure.

T. C. Stadtman, *Methods in Enzymology*, Vol. 1, Colowick, S. P. and Kaplan, N. O., Eds. Academic Press, N.Y. 1955, P. 678 and Stadtman, T. C., Cherkes, A. and Anfinsen, Jr. *Biol. Chem.*, 206, 511(1954) report partial purification of an enzyme from *Nocardia cholesterolicum*. This enzyme designated "cholesterol dehydrogenase" was purified sufficiently for use in a cholesterol assay based on measurement on the increase in absorbance at 240 nm owing to the formation of cholest-4-ene-3-one.

More recently Richmond in German Offenlegungsschrift 2,246,695 published Mar. 26, 1972 described an enzymatic assay for cholesterol using a "cholesterol oxidase" enzyme derived from a Nocardia species NRRL 5635 and 5636. According to this publication, the oxidase enzyme catalyzes degradation of free cholesterol to cholestenone and hydrogen peroxide. This degradation forms the basis for an enzymatic determination of cholesterol. Such a method still requires saponification of the cholesterol esters with concentrated KOH to obtain the free cholesterol which can then be oxidized in the presence of the cholesterol oxidase; and the handling of several solutions to obtain the final assay.

Finally, in the prior art, the use of lipase enzymes to hydrolyze triglycerides to glycerol is well known, and U.S. Pat. No. 3,703,591 to Bucolo et al., issued Nov. 21, 1972, describes an improved method for hydrolyzing triglycerides using a combination of lipase and protease enzymes. This patent notes specifically that cholesterol esters as found in blood serum do not hydrolyze in this system.

Concurrently filed U.S. Patent application Ser. No. 454,658 of Goodhue and Risley entitled "Method for the Preparation of Cholesterol Oxidase" describes a novel method for preparing the so-called cholesterol-dehydrogenase of Stadtman which yields a very pure product which demonstrates very high cholesterol oxidase activity, and which is useful in an enzymatic assay for free cholesterol.

Concurrently filed U.S. Patent application Ser. No. 454,659 in the name of Goodhue and Risley entitled "Method for the Enzymatic Hydrolysis of Cholesterol Esters" describes an enzymatic technique for the hydrolysis of cholesterol esters in complex aqueous solutions such as blood serum.

OBJECTS OF THE INVENTION

It is an object of the present invention to provide a greatly simplified totally enzymatic quantitative assay for cholesterol which permits total blood serum cholesterol quantification with no need for use or handling of corrosive materials and which can be performed in a single operation using a single novel test solution.

It is another object of the present invention to provide an improved aqueous test solution for cholesterol quantification which permits direct treatment of blood serum in a one step assay.

SUMMARY OF THE INVENTION

A totally enzymatic method for the quantitative analysis of cholesterol in complex aqueous solution comprising:

1. contacting a sample to be tested with a novel buffered aqueous test solution comprising:
   a. a lipase having cholesterol esterase activity;
   b. a protease; and
   c. cholesterol oxidase; and
2. measuring the quantity of one of the products of the oxidation of cholesterol to determine the total amount of cholesterol in free and esterified form in the sample under evaluation. Optionally, an indicator system for quantitatively detecting one or more of the cholesterol oxidation products, for example, peroxidase and a color indicator system which undergoes a color change in the presence of $H_2O_2$ and peroxidase may be included in the aqueous test solution. Quantification is preferably achieved using fluorometric or spectrophotometric techniques. According to a highly preferred embodiment the buffered aqueous test solution contains a surfactant. A dry mixture of lyophilized enzymes which need only be dissolved in an accurate amount of water to provide an assay solution and an element comprising a porous substrate having the foregoing solution imbibed therein are also described.

DETAILED DESCRIPTION OF THE INVENTION

Figure 1:
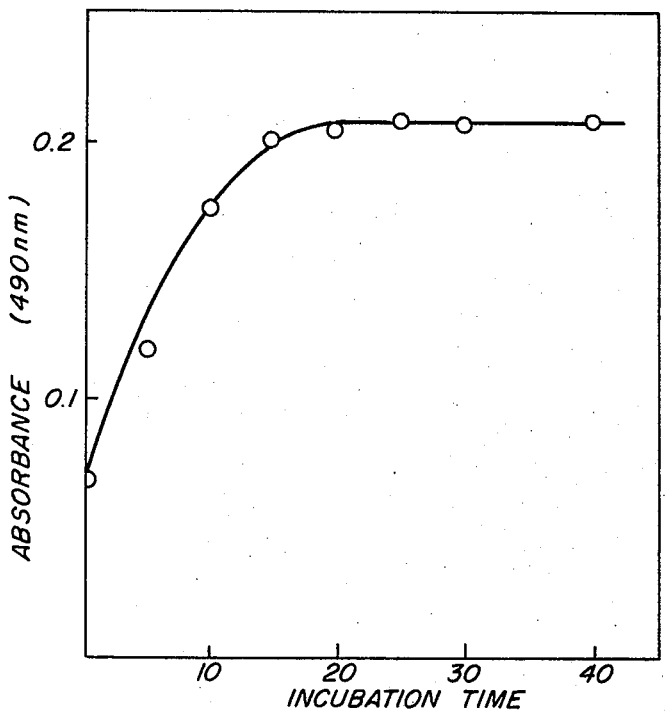
FIG. 1 shows solution absorbance change with time for an aqueous solution containing 50 µl of a serum standard (173 mg% cholesterol) assayed as described in Example I below.
Figure 2:
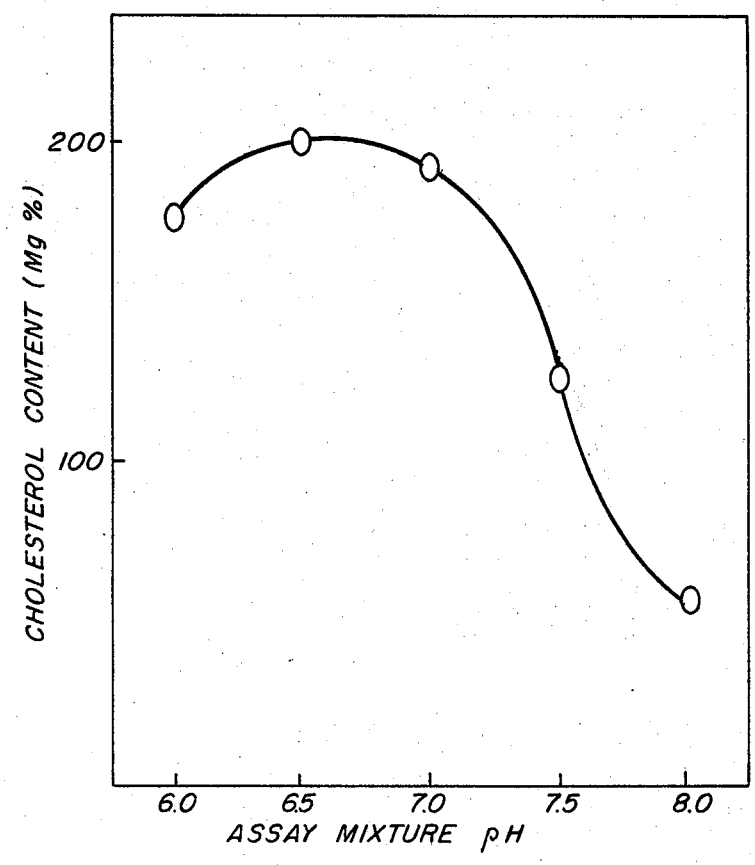
FIG. 2 is a graph showing the influence of solution pH on the enzymatic cholesterol determination of the present invention.

According to the present invention, a totally enzymatic technique for the assay of cholesterol in complex aqueous solutions (hereinafter blood serum) is described which comprises using a single aqueous solution to:

1. enzymatically hydrolyze cholesterol esters present in blood serum using a mixture of a lipase demonstrating cholesterol esterase activity and a protease and;
2. oxidize the free cholesterol with cholesterol oxidase to release products such as hydrogen peroxide and cholestenone which are quantitatively detectable using well known photometric, fluorometric, enzymatic, etc., techniques.

The chemical reactions involved in the process of this invention are as follows:

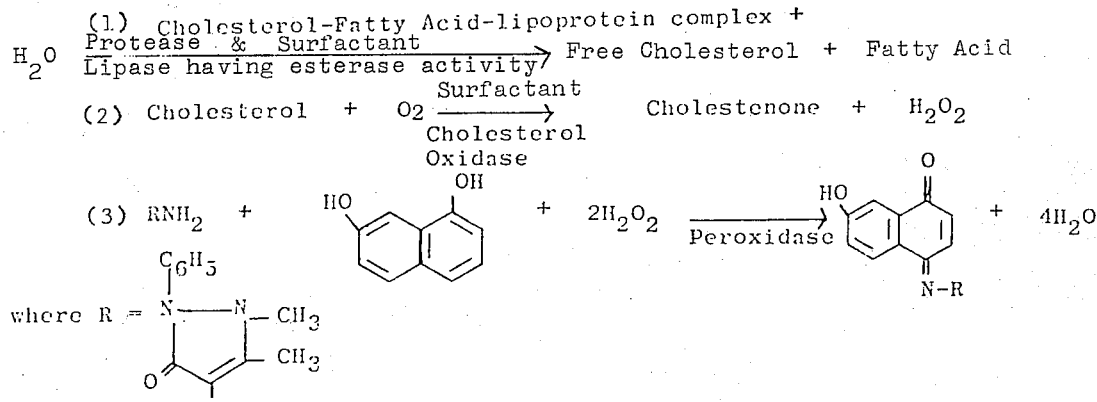

Reaction (1) indicates the release of free cholesterol from cholesterol and cholesterol-esters complexed with serum lipoproteins. Equation (2) shows the cholesterol oxidase reaction. Reaction (3) demonstrates one of the many possible peroxidase-dye systems which may be used to detect $H_2O_2$ production according to a preferred embodiment of the invention. Here a system involving oxidation of 4-aminoantipyrine and coupling with 1,7-dihydroxy-naphthalene to a compound with an absorption maximum at 490nm is shown. This dye system is chosen because of its sensitivity, its stability, and the lack of interference by other serum components. Blanks, run concomitantly with samples but lacking the oxidase, give no significant change in optical density within the times chosen for the assay as specified below. Of course, as mentioned above, any number of quantitating systems may be used in the successful practice of the invention.

As alluded to above, the desired requirements for an assay procedure for total serum cholesterol are that:
1. there be a minimum of handling of sample; 2. the system use a totally aqueous system; 3. the assay be simple and rapid; and
4. the assay be specific for cholesterol.

Requirement number (4) can best be satisified by using an enzyme that is specific for cholesterol.

Cholesterol oxidase, a soluble enzyme that oxidizes cholesterol to cholestenone and $H_2O_2$ has been isolated from the soil microorganism *Nocardia cholesterolicum* as described in concurrently filed U.S. Pat. application Ser. No. 454,658 entitled "Method for the Preparation of Cholesterol Oxidase" by growing cultures of *Nocardia cholesterolicum* species NRRL 5767 and 5768 in a conventional medium which includes as carbon source both a primary conventional carbon source such as glycerol and a secondary carbon source-enzyme inducer selected from the group consisting of cholesterol, cholesteryl linoleate, and cholest-4-ene-3-one, and extracting using conventional centrifugation and ion exchange chromatographic techniques. Fermentation modifications which can be used to substantially increase the yield of enzyme are also described in that application, however, purely conventional growth and extraction techniques of the type described in the Stadtman reference mentioned above can be used to obtain useful quantities of the enzyme.

The preparation of a second cholesterol oxidase enzyme which is also useful in the successful practice of the instant invention is described in German offenlegungsschrift No. 2,246,695 published March 26, 1973. This latter enzyme is obtained by growing Nocardia species NRRL 5635 or NRRL 5636 in a conventional medium, or as described in detail in that publication.

In serum approximately 75% of the total cholesterol is present as an ester with a fatty acid and both free and esterified cholesterol are usually complexed with plasma lipoprotein fractions. Since cholesterol oxidase will not react with cholesterol esters, procedures for total serum cholesterol analysis must include a method for obtaining all of the steroid in free and available form.

Concurrently filed U.S. Patent application Ser. No. 454,659 of Goodhue and Risley entitled "Method for the Enzymatic Hydrolysis of Cholesterol Esters" describes a totally enzymatic system which provides free cholesterol from serum cholesterol esters. Generally, this method requires treating the serum with a mixture of enzymes comprising a lipase having esterase activity and a protease. This combination of enzymes quite unexpectedly saponifies the cholesterol esters in a highly efficient manner. A number of microbial lipases hydrolyze cholesterol esters to some degree as described in the aforementioned patent application which is incorporated herein by reference. To obtain maximum effect from the lipase, as described in detail in the aforementioned Goodhue and Risley application, it is necessary to incorporate a protease.

The assay of the present invention combines the ester hydrolysis of Goodhue et al with the cholesterol oxidase assay for free cholesterol described above to provide a single solution assay for total serum cholesterol.

According to a preferred embodiment of the method of the present invention, a standard solution is used to insure the accuracy of the buffered reagent solution described hereinbelow.

It should be noted at this point that one of the most surprising aspects of the present invention is that proteases which usually function to degrade protein, for some as yet unexplained reason, do not destroy the enzymes (themselves proteins) which are also present in the test solutions of the instant invention.

The lipase present in the test solution of the instant invention may be of plant or animal origin but must demonstrate esterase activity as shown in example 3 of U.S. Patent application Ser. No. 454,659 of Goodhue et al. which describes a screening procedure for determining the esterase activity of lipases. This screening technique involves adding a fixed amount (1200 units/ml) of the lipase to a standard cholesteryl linoleate solution at pH 7.0, incubating at 37°C under $N_2$ for 2 hours and determining the amount of ester left in the solution by the hydroxylamine method of J. Vonohoeffmayr and R. Fried, Z. Klin. Chem. U. Klin. Biochem. 8 134 (1970). According to the method described in this test, any lipase which hydrolyzes over about 25 mg% of the ester in a standard solution containing 200 mg cholesteryl linoleate is suitable for use in the successful practice of the instant invention. Among the useful lipases it is preferred to use a microbial lipase such as the lipase from *Candida cylindracca*, and lipases having similar activity. Specifically preferred commercial lipases include wheat germ lipase supplied by Miles Laboratories of Elkhart, Ind., Lipase 3000 supplied by Wilson Laboratories, Chicago, Ill., Steapsin (both of the latter ar pancreatic enzymes) supplied by Sigma Chem. Co., St. Louis, Mo., and Lipase M from *Candida cylindracca* supplied by Enzyme Development Corp., New York, N.Y. This last enzyme produces quantitative hydrolysis of serum cholesterol esters at elevated levels of serum cholesterol esters in a period on the order of 10 minutes at 50°C.

Proteases in general may be used. These include by way of example, chymotrypsin, *Streptomyces griseus* protease (commercially available under the registered trademark "Pronase"), proteases from *Aspergillus oryzae* and *Bacillus subtilis*, elastase, papain and bromelain. Mixtures of such enzymes may of course also be employed at times with advantageous results as demonstrated in the examples below.

The free cholesterol liberated by the action of the foregoing enzyme mixture is then assayed using a cholesterol oxidase enzyme also present in the test solution. According to the present invention, the total free cholesterol is preferably oxidized using a cholesterol oxidase enzyme of the type described in concurrently filed U.S. Patent application Ser. No. 454,658 of Goodhue and Risley i.e. a cholesterol oxidase derived from the bacterium *Nocardia cholesterolicum* species identified as "rough" and smooth strains called NRRL 5767 and NRRL 5768 of the Agricultural Research Service of the U.S. Department of Agriculture at the ARS Culture Collection Investigations Fermentation Laboratory, Peoria, Ill. Alternatively, the cholestereol oxidases described in the aforementioned German Offenlegungsschrift 2,246,695, derived from NRRL strains 5635 and 5636 could also be dissolved in the test solution to achieve cholesterol oxidation. The products of this cholesterol oxidation, namely cholestenone and hydrogen peroxide can then be quantified by either measuring the absorbance of the solution at 240 nm to determine the level of cholestenone produced or by measuring the amount of hydrogen peroxide generated in the cholesterol oxidation process.

If measurement of the cholestenone produced is selected as the quantifying technique, then straightforward well known methods for measuring the absorbance of the combined test solution and sample at 240 nm may be used.

According to a preferred embodiment of the present invention, the test solution includes, in addition to the lipase, protease and cholesterol oxidase described hereinabove, a color indicator system for detecting the concentration of a product of the cholesterol oxidation. Most generally, such a color indicator system will be designed to detect the concentration of hydrogen peroxide generated by the oxidation. Such $H_2O_2$ color indicator systems are well known in the art and are described in detail in U.S. Pat. No. 2,981,606 to keston issued Apr. 25, 1961.

Color indicator systems of this type generally comprise peroxidase or a peroxidase-like substance having peroxidase activity, and a substrate for peroxidase capable of forming color or changing color in the presence of hydrogen peroxide.

Alternatively, the indicator material may be one or more substances which undergo no substantial color change upon oxidation in the presence of $H_2O_2$ and peroxidase, but which in that oxidized form react with a color forming or color changing substance to give visible, quantitative evidence of the detection reaction. U.S. Pat. No. 2,981,606 in particular provides a detailed description and listing of such color indicating systems, any of which may be used in the present novel compositions and methods so long as they are compatable with the other components of the system.

As a further alternative, it is possible to separate one or more of the products of the cholesterol oxidation and quantify them in a separate operation. This, however, would not seem particularly desirable in view of the additional handling, etc., involved in such a method.

A peroxidase is an enzyme which will catalyze a reaction wherein hydrogen peroxide oxidizes another substance. The peroxidases are generally conjugated proteins containing iron porphyrin. Peroxidase occurs in horseradish, potatoes, figtree sap and turnips (plant peroxidase); in milk (lacto peroxidase); and in white blood corpuscles (verdo peroxidase). Certain synthetic peroxidases, such as disclosed by Theorell and Maehly in Acta Chem. Scand., vol. 4, pages 422–434 (1950), are also satisfactory. Less satisfactory are such substances as hemin, methemoglobin, oxyhemoglobin, hemoglobin, hemochromogen, alkaline hematin, hemin derivatives, and certain other compounds which demonstrate peroxidative or peroxidase-like activity, namely, the ability to catlyze the oxidation of another substance by means of hydrogen peroxide and other peroxides. The various peroxidases are believed to certain hematin. It is again worthy of note that in the present solutions the protease does not significantly destroy the peroxidase during the usual assay period which ranges up to about 10–15 min. As a precaution against protease degradation of the other components of the assay solution, it is desirable to mix the solutions immediately prior to use or alternatively to withhold the protease from the solution and to add it just prior to performance of the assay. The protease being readily soluble, this is not exceedingly difficult or inconvenient step.

Other substances which are not enzymes but which possess peroxidase-like activity are: iron sulfocyanate, iron tannate, ferrous ferrocyanide, chromic salts (such as potassium chromic sulfate) absorbed in silica gel, etc. These substances are not as satisfactory as peroxidase per se.

Color-forming substrates of peroxidase and peroxidaselike substances which produce a color formation in the presence of hydrogen peroxide and peroxidase which may be employed in the indicator of the present invention include the following substances:

1. Monoamines, such as aniline and its derivatives, ortho-toluidine, para-toluidine, etc.;
2. Diamines, such as ortho-phenylenediamine, N,N'-dimethyl-para-phenylenediamine, N,N'-diethyl phenylenediamine, benzidine (which produces a blue or brown color), dianisidine (turns green or brown), etc.;
3. Phenols, such as phenol per se (producing a yellow color), thymol, ortho-, meta and para-cresols (producing a green-yellow color, a pink color and a milky suspension, respectively), alpha-naphthol (producing a magenta color), beta-naphthol (producing a white precipitate), etc.;
4. Polyphenols, such as catechol, guaiacol (which forms an orange color), orcinol, pyrogallol (producing a reddish or yellow color), p,p-dihydroxydiphenyl and phloroglucinol;
5. Aromatic acids, such as salicyclic, pyrocatechuic and gallic acids;
6. Leuco dyes, such as leucomalachite green (to produce malachite green) and leucophenolphthalein (desirably employed in an alkaline medium);
7. Colored dyes, such as 2,6-dichlorophenolindophenol;
8. Various biological substances, such as the flavones, tyrosine, dihydroxyphenylalanine (producing an orange-reddish color) and tryptophan;
9. Other substances, such as gum guaiac, guaiaconic acid potassium or sodium iodide, and other water soluble iodides, and bilirubin (producing a greenish color); and
10. Such particular dyes as 2,2'-azine-di(3-ethylbenzo thiazoline-(6)-sulfonic acid) and 3,3'-diaminobenzidine.

A specifically prefered indicating system for incorporation into the solution of the present invention utilizes, in addition to the peroxidase, a dye couple, i.e. a pair of compounds, one of which in its oxidized state reacts with the other to produce a distinct color in a quantitative fashion. Particularly preferred dye-couple components include 1,7-dihydroxy naphthalene as the coupler and 4-aminoantipyrine as the oxidizable species. Alternatively, if it is desired to use an indicator which changes color immediately upon oxidation, 4-methoxy-1-naphthalene is preferably used.

The novel reagent solution of the present invention should be buffered to a pH of between about 5.5 and 8.5 and is preferably buffered between 6.5 and 7.0. Useful results can be achieved outside of this pH range, however, the influence of pH and buffer can be substantial. The curve which reports completeness of reaction at various assay pH values demonstrates a maximum plateau at pH values between 6.5 and 7.0. Completeness of reaction is also influenced by the buffer chosen. Thus, at pH 7.0 potassium phosphate gave the maximum value for total cholesterol while dimethyl glutarate, Tris-HCl and HEPES buffer gave less final (although useful) cholesterol concentrations in standard solutions. Thus, it is preferred to buffer the reagent solution at a point from about 6.5 to about 7.0 with a phosphate buffer although very useful results can be achieved outside this pH range with other buffers, and buffers such as imidazole, cacodylate, dimethyl glutarate as well as PIPES, MES, and BES described by Good in Biochemistry 5, 467 (1966) will produce solutions well within this range.

The buffered reagent solutions of the present invention should contain per ml from about 10 to about 50 units of a lipase having esterase activity, from about 0.5 to about 2 units of protease, from about 0.002 to about 0.05 units of cholesterol oxidase and be buffered to a pH of from about 5.5 to about 8.5. According to a highly preferred embodiment of the present invention, an aqueous solution 100 ml total volume comprising from about 2,000 to about 3,000 units of lipase having cholesterol esterase activity from about 50 to about 75 units of protease from *B. subtilis*, and from about 0.5 to about 1.5 units of cholesterol oxidase buffered with potassium phosphate to a pH of between about 6.5 and 7.0 is used in the assay of cholesterol serum for cholesterol content.

Although the foregoing solution can provide useful results, it is highly desirable in order to provide a sufficiently rapid assay to produce commercial feasibility to include a small concentration of a surfactant. Generally useful results are achieved by incorporating from about 0.05 to about 0.5% by weight of a surfactant. Although the choice of surfactant is apparently not critical, it should be one which does not inhibit the activity of any of the active enzyme or chemical reagents in the solution. Particularly useful surfactants include deoxycholate and nonionic surfactants such as the octyl phenoxy polyethoxy ethanols commercially available from Rohm and Haas Co. under the Triton tradename (in particular Triton X-100), the (P-nonylphenoxy) glycerols and polyethylene glycols.

Units of the lipase and protease enzymes useful in the assay solutions of the present invention are defined as follows:

1 unit of lipase = that amount of enzyme that will produce 1 $\mu$mole of fatty acid per minute from a triglyceride mixture such as olive oil at pH 7.0, 37°C.

1 unit of protease = amount of enzyme that will hydrolyze casein to produce color equivalent to 1 $\mu$mole tyrosine per minute at pH 7.5, 37°C.

When the solution also includes color indicating components as described above, peroxidase is present at a concentration per ml of from about 3 to about 6 units, and the actual color-forming portion of the system present at a level which provides sufficient oxidizable material and coupler if one is used to stoichiometrically produce the indication.

The period of time requires for the assay for cholesterol in complex samples containing both free and esterified cholesterol using solutions of the type described herein will vary over a broad range depending upon the concentration of free and esterified cholesterol present in the sample. This phenomena is demonstrated graphically in Example 2 below. Generally, however, an assay period, i.e. the time that the sample is in contact with the solution before measurement according to step (b) is performed, of at least about 10 minutes is required.

The time of contact between the sample and the solution prior to measurement will also vary rather significantly with time, and at elevated temperatures on the order of 60° – 70°C and under carefully controlled pressure conditions which inhibit the vaporization of hydrogen peroxide, the assay may be carried out in shorter periods of time. It is desirable, however, to achieve optimum results with a minimum of precautionary measures to contact the sample with the solution at a temperature of between about 25° and 50°C.

Although the assay composition of the present invention is generally used in solution form, it should be recognized that it is possible to supply the basic enzymatic and other ingredients in other than solution form.

It is within the scope of the present invention to provide "dry" mixtures of reagents comprising lyophilized lipase, protease, and cholesterol oxidase and buffer in the relative proportions described above which mixture is merely dissolved in a predetermined amount of water to provide the novel assay solution of the present invention. Such dry mixtures may also include lyophilized peroxidase and the dry components of the indicator system in the proportions indicated.

It is of course also desirable to include in such dry mmixtures a surfactant of the type described above to provide a preferred composition. Since only the salts of deoxycholates of the preferred surfactant materials are solids, it may be desirable to provide the dry components without the surfactant and at the time of mixing add the dry components to water containing the preferred concentration of surfactant and also the buffer if this is convenient.

As mentioned above, it is a peculiar characteristic of the solutions of the instant invention that the protease does not destroy the other proteinaceous components of the mixture during the course of the assay. Such degradation generally begins immediately, however, it appears to have no significant effect on solutions stored under refrigerated conditions (0° – 5°C) after 8 hours. Hence it is desirable to prepare the solution and store it under refrigeration or to maintain the components in a dry state until just prior to use, to insure optimum results.

Where quantitative results of the type obtainable with the solutions described above are not necessary but merely qualitative data are required, it is possible to imbibe the analytical solution into a porous bibulous substrate, for example, a piece of filter paper which upon drying produces an impregnated element which will provide a qualitative and under carefully controlled conditions of use an even semi-quantitative analytical element.

The following examples serve to illustrate particular embodiments of the present invention.

Example 1: Assay Standardization

The cholesterol assay system is standardized using "Validate," a lyophilized standard serum manufactured by Warner Lambert (Morris Plains, N. J.) as substrate. Validate contains approximately 160 mg cholesterol per dl. Enough cholesterol oxidase was added to completely oxidize the amount of cholesterol present in 0.1 ml validate in 15 minutes. A plot of optical density change with time when 50 $\mu$l of Validate (total cholesterol 173 mg per dl) was used as substrate is shown in FIG. 1. The data show that the reaction is complete in 15 minutes at 50°C when 0.05 units of cholesterol oxidase was used per assay. Optical density readings were made using a Spectronic 20 photometer.

Example 2

Figure 3:
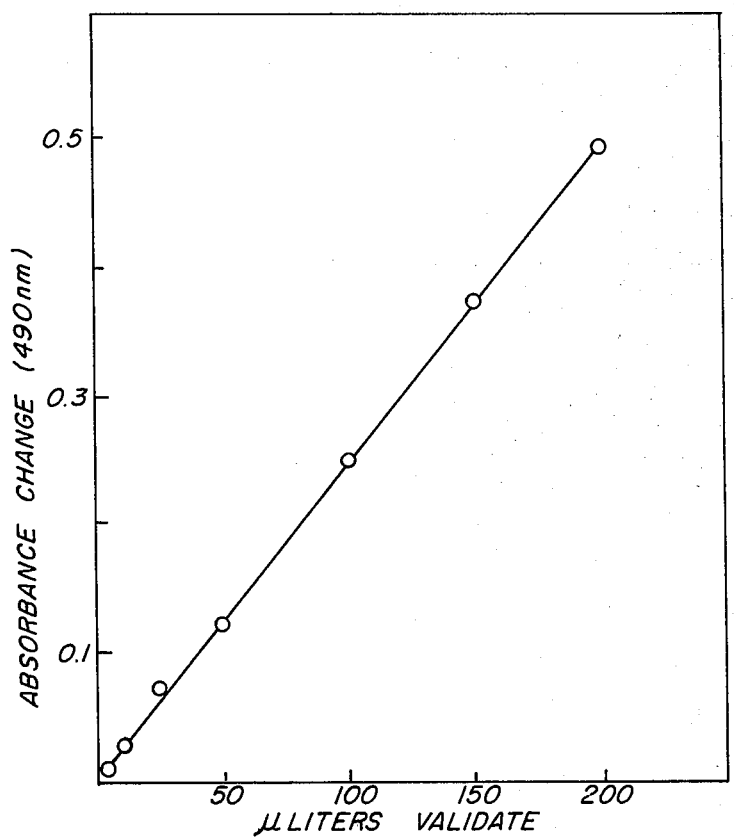
FIG. 3 shows a standard curve for total cholesterol determination using the method of the present invention.

A reagent buffer solution comprising 2400 units of Lipase M (yeast lipase manufactured by Enzyme Development Corp.), 66 units of protease from *B. subtilis*, 406 units peroxidase (from horseradish), 0.65 units cholesterol oxidase, 3.4 ml 10% W/V Triton X-100, 40 $\mu$ moles 4-amino-antipyrine, 22 $\mu$ moles 1,7-dihydroxynaphthalene, and 96 ml 50 mM phosphate buffer, pH 7.0, was used to demonstrate the effective range of the assay. As shown in FIG. 3, the assay was linear with Validate samples containing 8.5 to 340.0 $\mu$g cholesterol. Completion time for the assay increased as the substrate concentration increased, however, the sample containing 170 $\mu$g cholesterol was completed within 15 minutes.

Example 3

Figure 4:
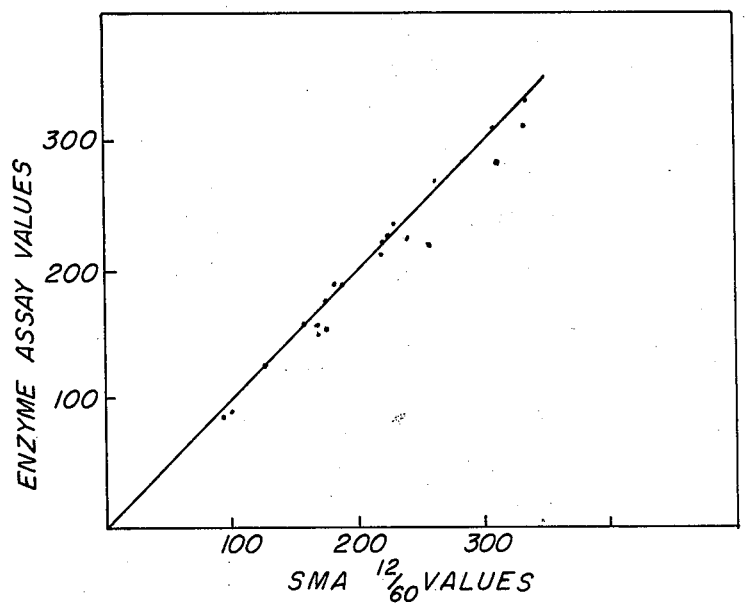
FIG. 4 compares the analysis of 20 human serum samples assayed on the Technicon SMA 12/60 and according to the method of the instant invention.

For an assasy to be commercially useful, it must be accurate and precise. Human serum previously assayed for total cholesterol with a Technicon SMA 12/60 Auto Analyzer were assayed by the enzyme technique of the instant invention using the solution of Example 2. The data are shown in FIG. 4. An excellent correlation between the cholesterol contents detemined by these two methods is seen. A statistical analysis of the data gives a correlation coefficient of 0.987 and a linear regression of $y = 0.957x + 2.9$.

Example 4

In order to demonstrate the reproducibility of the assay, three serum pools were each assayed ten times using the method of Example 2. Table 1 shows the data for these replicate assays.

TABLE 1

Results of Multiple Assays on Each of 3 Pooled Serum Samples

| | 1 | 2 | 3 |
|---|---|---|---|
| | | mg/dl | |
| | 121 | 211 | 273 |
| | 176 | 227 | 234 |
| | 206 | 241 | 227 |
| | 146 | 261 | 230 |
| | 170 | 269 | 208 |
| | 168 | 247 | 208 |
| | 176 | 258 | 282 |
| | 190 | 240 | 287 |
| | 192 | 237 | 216 |
| | 168 | | 299 |
| Mean | 171 | 243 | 246 |
| SD | 20 | 18 | 35 |
| CV% | 11 | 7 | 14 |

Among the advantages of the hereinbelow described cholesterol assay and composition are the following:

1. it is completely enzymatic and requires absolutely no handling of corrosive materials;
2. it is a rapid one step process which requires only minimal handling for total cholesterol determination from blood serum; and
3. it is readily automated and easily monitored using conventional spectrophotometric and fluorometric methods.

Extension and modifications

As alluded to hereinabove, the amount of free cholesterol present in the reaction mixture after treatment of serum with the lipase, protease, and cholesterol oxidase composition may be determined by any number of alternative procedures including:

1. measuring the spectral absorbance of the cholestenone formed in the oxidation reaction;
2. extracting the cholestenone and measuring the abosrbance of its phenylhydrazone;
3. using a different peroxidase-dye coupler; and
4. determining peroxide by a known chemical method.

While the invention has been described in detail with particular reference to preferred embodiments thereof, it will be understood that variations and modifications can be effected within the spirit and scope of the invention.

We claim:

1. An aqueous test solution useful in the quantitative assay of a sample for total cholesterol content comprising:
   a. a lipase having cholesterol esterase activity;
   b. a protease; and
   c. cholesterol oxidase said test solution being buffered to a pH of between about 5.5 and 8.5.

2. An aqueous test solution as described in claim 1 wherein said choesterol oxidase is selected from the group consisting of cholesterol oxidase enzymes produced by a bacterial strain selected from the group consisting of NRRL 5767, NRRL 5768, NRRL 5635 and NRRL 5636.

3. An aqueous test solution as described in claim 1 wherein said cholesterol oxidase is selected from the group consisting of cholesterol oxidase enzymes produced by a bacterial strain selected from the group consisting of NRRL 5635 and NRRL 5636.

4. An aqueous test solution as described in claim 1 which also includes a surfactant.

5. An aqueous test solution as described in claim 3 which also includes a surfactant.

6. An aqueous test solution as described in claim 4 wherein said surfactant is selected from the group consisting of deoxycholate, octyl phenoxy polyethoxy ethanols, (p-nonylphenoxy) glycerols and polyethylene glycols.

7. An aqueous test solution as described in claim 4 wherein said surfactant is nonionic.

8. An aqueous test solution as described in claim 5 wherein said surfactant is nonionic.

9. An aqueous test solution as described in claim 4 wherein the concentration of said surfactant ranges from about 0.05 to about 0.5% by weight.

10. An aqueous test solution as described in claim 5 wherein the concentration of said surfactant ranges from about 0.05 to about 0.5% by weight.

11. An aqueous test solution as described in claim 5 wherein said lipase is from a preparation 50 mg of which hydrolyzes at least about 25 mg% of the cholesteryl linoleate present in 5 ml of a standard composition comprising 200 mg of cholesteryl linoleate, 5 ml ethyl ether, 100 ml water, and 430 mg sodium cholate buffered to a pH of 7.0 with 0.1 M phosphate during incubation for 2 hours at 37°C under nitrogen.

12. An aqueous test solution as described in claim 4 wherein said lipase is a microbial lipase.

13. An aqueous test solution as described in claim 12 wherein said lipase is from *Candida cylindracca*.

14. An aqueous test solution as described in claim 5 wherein said lipase is from *Candida cylindracca*.

15. An aqueous test solution as described in claim 4 wherein said lipase is selected from the group consisting of wheat germ lipase, pancreatic lipase and the lipase from *Candida cylindracca*.

16. An aqueous test solution as described in claim 15 wherein the concentration of said lipase ranges from about 10 to about 50 units per ml of solution.

17. An aqueous test solution as described in claim 4 wherein the concentration of said cholesterol oxidase ranges from about 0.002 to about 0.05 units per ml of solution.

18. An aqueous test solution as described in claim 4 wherein said protease is selected from the group consisting of chymotrypsin, papain, bromelain, *Streptomyces griseus* protease, elastase, *Bacillus subtilis* protease and *Aspergillus oryzae* protease.

19. An aqueous test solution as described in claim 8 wherein said protease is selected from the group consisting of chymotrypsin, papain, bromelain, *Streptomyces griseus* protease, elastase, *Bacillus subtilis* protease and *Aspergillus oryzae* protease.

20. An aqueous test solution as described in claim 15 wherein said protease is selected from the group consisting of chymotrypsin, papain, bromelain, *Streptomyces griseus* protease, elastase, *Bacillus subtilis* protease and *Aspergillus oryzae* protease.

21. An aqueous test solution as described in claim 13 wherein said protease is selected from the group consisting of chymotrypsin, papain, bromelain, *Streptomyces griseus* protease, elastase, *Bacillus subtilis* protease and *Aspergillus oryzae* protease.

22. An aqueous test solution as described in claim 4 wherein the concentration of said protease ranges from about 0.5 to about 2.0 units per ml.

23. An aqueous test solution as described in claim 4 wherein potassium phosphate is used to buffer the solution to a pH of between about 6.5 and 7.0.

24. An aqueous test solution as described in claim 4 further comprising an indicator system for quantitatively detecting at least one of the cholesterol oxidation products.

25. An aqueous test solution as described in claim 8 wherein said indicator system comprises peroxidase and a color indicator system which undergoes a color change in the presence of peroxidase and hydrogen peroxide.

26. An aqueous test solution as described in claim 25 wherein said color indicator system comprises a leuco dye which undergoes a detectable color change upon oxidation under the influence of peroxidase and hydrogen peroxide.

27. An aqueous test solution as described in claim 25 wherein said color indicator system comprises at least one substance which undergoes no substantial color change upon oxidation in the presence of hydrogen peroxide and peroxidase, but which in its oxidized form reacts with a coupler eto cause a quantifable energy absorption shift or color change.

28. An aqueous test solution as described in claim 12 wherein said substance which undergoes no substantial color change is 4-amino-antipyrine and said coupler is 1,7-dihydroxynaphthalene.

29. An aqueous test solution as described in claim 27 wherein said substance which undergoes no substantial color change upon oxidation and said coupler are a single compound which undergoes autocoupling in its oxidized state.

30. An aqueous test solution as described in claim 14 wherein said single compound is 4-methoxy-1-naphthalene.

31. An aqueous test solution as described in claim 24 which is buffered to a pH of between about 6.5 and 7.0 with a phosphate buffer.

32. An aqueous test solution as described in claim 25 comprising from about 3 to about 6 units of peroxidase per ml.

33. An aqueous test solution useful in the quantitative assay of a sample for total cholesterol content comprising:
   a. from about 0.002 to about 0.5 units of a cholesterol oxidase per ml;
   b. from about 10 to about 50 units of a lipase having cholesterol esterase activity per ml;
   c. from about 0.5 to about 2.0 units of a protease per ml; and
   d. from about .05 to about 0.5 percent by weight of a surfactant, said test solution being buffered to a pH of between about 5.5 and 8.5.

34. An aqueous test solution as described in claim 33 wherein said cholesterol oxidase is selected from the group consisting of cholesterol oxidase enzymes produced by a bacterial strain selected from the group consisting of NRRL 5635 and NRRL 5636.

35. An aqueous test solution as described in claim 33 wherein said surfactant is selected from the group consisting of deoxycholate, octyl phenoxy polyethoxy ethanols, (p-nonylphenoxy) glycerols and polyethylene glycols.

36. An aqueous test solution as described in claim 33 wherein the concentration of said surfactant ranges from about 0.05 to about 0.5% by weight.

37. An aqueous test solution as described in claim 33 wherein said lipase is from *Candida cylindracca*.

38. An aqueous test solution as described in claim 37 wherein said lipase is from *Candida cylindracca*.

39. An aqueous test solution as described in claim 33 wherein said protease is selected from the group consisting of chymotrypsin, papain, bromelain, *Streptomyces griseus* protease, elastase, *Bacillus subtilis* protease and *Aspergillus oryzae* protease.

40. An aqueous test solution as described in claim 38 wherein said protease is from *Bacillus subtilis*.

41. An aqueous test solution as described in claim 33 wherein potassium phosphate is used to buffer the solution to a pH of between about 6.5 and 7.0.

42. An aqueous test solution as described in claim 33 further comprising an indicator system for quantitatively detecting at least one of the cholesterol oxidation products.

43. An aqueous test solution as described in claim 42 wherein said indicator system comprises peroxidase and a color indicator system which undergoes a color change in the presence of peroxidase and hydrogen peroxide.

44. An aqueous test solution as described in claim 43 wherein said color indicator system comprises at least one substance which undergoes no substantial color change upon oxidation in the presence of hydrogen peroxide and peroxidase, but which in its oxidized form reacts with a coupler to cause a quantifable energy absorption shift or color change.

45. An aqueous test solution as described in claim 44 wherein said substance which undergoes no substantial color change is 4-aminoantipyrine and said coupler is 1,7-dihydroxynaphthalene.

46. An aqueous test solution as described in claim 45 wherein said substance which undergoes no substantial color change upon oxidation and said coupler are a single compound which undergoes autocoupling in its oxidized state.

47. An aqueous test solution as described in claim 46 wherein said single compound is 4-methoxy-1-naphthalene.

48. An aqueous test solution as described in claim 47 which is buffered to a pH of between about 6.5 and 7.0 with a phosphate buffer.

49. An aqueous test solution as described in claim 48 comprising from about 3 to about 6 units of peroxidase per ml.

50. A totally enzymatic method for the quantitative analysis of cholesterol in a complex mixture of cholesterol and cholesterol esters comprising the steps of:
   1. contacting a sample to be tested with an aqueous test solution buffered to a pH of between about 5.5 and about 8.5 comprising:
      a. from about 0.002 to about 0.5 units of a cholesterol oxidase per ml;
      b. from about 10 to about 50 units of a lipase having cholesterol esterase activity per ml;
      c. from about 0.5 to about 2.0 units of a protease per ml; and
      d. from about .05 to about 0.5 percent by weight of a surfactant, said test solution being buffered to a pH of between about 5.5 and 8.5;
   for a time sufficient to cause substantially complete hydrolysis of said cholesterol esters and substantially complete oxidation of cholesterol; and
   2. measuring the quantity of at least one of the products of the cholesterol induced decomposition of cholesterol to determine the total amount of free and esterified cholesterol in the sample.

51. A method as described in claim 50 wherein said sample is contacted with said test solution for a period of at least about 10 minutes at a temperature of between about 25°C and about 50°C.

52. An aqueous test solution as described in claim 51 wherein said cholesterol oxidase is selected from the group consisting of cholesterol oxidase enzymes produced by a bacterial strain selected from the group consisting of NRRL 5635 and NRRL 5636.

53. An aqueous test solution as described in claim 52 wherein said surfactant is selected from the group consisting of deoxycholate, octyl phenoxy polyethoxy ethanols, (p-nonylphenoxy) glycerols and polyethylene glycols.

54. An aqueous test solution as described in claim 52 wherein the concentration of said surfactant ranges from about 0.05 to about 0.5% by weight.

55. An aqueous test solution as described in claim 52 wherein said lipase is from *Candida cylindracca*.

56. An aqueous test solution as described in claim 52 wherein said lipase is from *Candida cylindracca*.

57. An aqueous test solution as described in claim 52 wherein said protease is selected from the group consisting of chymotrypsin, papain, bromelain, *Streptomyces griseus* protease, elastase, *Bacillus subtilis* protease and *Aspergillus oryzae* protease.

58. An aqueous test solution as described in claim 52 wherein said protease is from *Bacillus subtilis*.

59. An aqueous test solution as described in claim 52 wherein potassium phosphate is used to buffer the solution to a pH of between about 6.5 and 7.0.

60. An aqueous test solution as described in claim 52 further comprising an indicator system for quantitatively detecting at least one of the cholesterol oxidation products.

61. An aqueous test solution as described in claim 52 wherein said indicator system comprises peroxidase and a color indicator system which undergoes a color change in the presence of peroxidase and hydrogen peroxide.

62. An aqueous test solution as described in claim 52 wherein said color indicator system comprises at least one substance which undergoes no substantial color change upon oxidation in the presence of hydrogen peroxide and peroxidase, but which in its oxidized form reacts with a coupler to cause a quantizable energy absorption shift or color change.

63. An aqueous test solution as described in claim 62 wherein said substance which undergoes no substantial color change is 4-aminoantipyrine and said coupler is 1,7-hydroxy-naphthalene.

64. An aqueous test solution as described in claim 62 wherein said substance which undergoes no substantial color change upon oxidation and said coupler are a single compound which undergoes autocoupling in its oxidized state.

65. An aqueous test solution as described in claim 62 wherein said single compound is 4-methoxy-1-naphthalene.

66. An aqueous test solution as described in claim 52 which is buffered to a pH of between about 6.5 and 7.0 with a phosphate buffer.

67. An aqueous test solution as described in claim 52 comprising from about 3 to about 6 units of peroxidase per ml.

68. A composition of matter comprising in dry form sufficient cholesterol oxidase, lipase and protease to provide when dissolved in water an aqueous test solution useful in the quantitative assay of a sample for total cholesterol content comprising:
  a. from about 0.002 to about 0.5 units of a cholesterol oxidase per ml;
  b. from about 10 to about 50 units of a lipase having cholesterol esterase activity per ml;
  c. from about 0.5 to about 2.0 units of a protease per ml; and
  d. from about .05 to about 0.5 percent by weight of a surfactant, said test solution being buffered to a pH of between about 5.5 and 8.5.

69. The composition of claim 68 further comprising sufficient buffer to buffer said aqueous test solution to a pH of between about 5.5 and 8.5.

70. A composition as described in claim 68 wherein said cholesterol oxidase is selected from the group consisting of cholesterol oxidase enzymes produced by a bacterial strain selected from the group consisting of NRRL 5635 and NRRL 5636.

71. A composition as described in claim 68 wherein said surfactant is selected from the group consisting of deoxycholate, octyl phenoxy polyethoxy ethanols, (p-nonylphenoxy) glycerols and polyethylene glycols.

72. A composition as described in claim 68 wherein the concentration of said surfactant ranges from about 0.05 to about 0.5% by weight.

73. A composition as described in claim 68 wherein said lipase is from *Candida cylindracca*.

74. A composition as described in claim 73 wherein said lipase is from *Candida cylindracca*.

75. A composition as described in claim 68 wherein said protease is selected from the group consisting of chymotrypsin, papain, bromelain, *Streptomyces griseus* protease, elastase, *Bacillus subtilis* protease and *Aspergillus oryzae* protease.

76. A composition as described in claim 75 wherein said protease is from *Bacillus subtilis*.

77. A composition as described in claim 68 wherein potassium phosphate is used to buffer the solution to a pH of between about 6.5 and 7.0.

78. A composition as described in claim 68 further comprising an indicator system for quantitatively detecting at least one of the cholesterol oxidation products.

79. A composition as described in claim 78 wherein said indicator system comprises peroxidase and a color indicator system which undergoes a color change in the presence of peroxidase and hydrogen peroxide.

80. A composition as described in claim 79 wherein said color indicator system comprises at least one substance which undergoes no substantial color change upon oxidation in the presence of hydrogen peroxide and peroxidase, but which in its oxidized form reacts with a coupler to cause a quantizable energy absorption shift or color change.

81. A composition as described in claim 80 wherein said substance which undergoes no substantial color change is 4-aminoantipyrine and said coupler 1,7-dihydroxy-naphthalene.

82. A composition as described in claim 81 wherein said substance which undergoes no substantial color change upon oxidation and said coupler are a single compound which undergoes autocoupling in its oxidized state.

83. A composition as described in claim 82 wherein said single compound is 4-methoxy-1-naphthalene.

84. A composition as described in claim 83 which is buffered to a pH of between about 6.5 and 7.0 with a phosphate buffer.

85. A composition as described in claim 84 comprising from about 3 to about 6 units of peroxidase per ml.

86. An analytical element useful in the quantitative analysis of complex solutions for cholesterol content comprising a bibulous substate impregnated with the dried residue of a solution comprising an aqueous test solution useful in the quantitative assay of a sample for total cholesterol content comprising:
- a. from about 0.002 to about 0.5 units of a cholesterol oxidase per ml;
- b. from about 10 to about 50 units of a lipase having cholesterol esterase activity per ml;
- c. from about 0.5 to about 2.0 units of a protease per ml; and
- d. from about .05 to about 0.5 percent by weight of a surfactant, said test solution being buffered to a pH of between about 5.5 and 8.5.

* * * * *

UNITED STATES PATENT AND TRADEMARK OFFICE
CERTIFICATE OF CORRECTION

PATENT NO. : 3,884,764
DATED : May 20, 1975
INVENTOR(S) : Charles T. Goodhue et al It is certified that error appears in the above-identified patent and that said Letters Patent are hereby corrected as shown below:

Column 11, line 41, "choesterol" should read --cholesterol--.

Column 12, line 59, "8" should read --24--.

Column 13, line 8, "eto" should read --to--; line 8, "quantifable" should read --quantifiable--; line 10, "12" should read --27--; line 19, "14" should read --29--; line 55, "37" should read --34--.

Column 14, line 15, "quantifable" should read --quantifiable--.

Column 15, line 7, "52" should read --50--; line 16, "52" should read --57--; line 25, "52" should read --60--; line 30, "52" should read --60--; line 46, "62" should read --64--; line 52, "52" should read --60--.

Column 16, line 21, "73" should read --70--; line 52, "81" should read --80--; line 66, "substate" should read --substrate--.

Signed and Sealed this eleventh Day of May 1976

[SEAL]

Attest:

RUTH C. MASON
Attesting Officer

C. MARSHALL DANN
Commissioner of Patents and Trademarks